US012596527B1

(12) United States Patent
Powell

(10) Patent No.: US 12,596,527 B1
(45) Date of Patent: Apr. 7, 2026

(54) CLOCKLESS PARALLEL MULTIPLICATION CIRCUIT

(71) Applicant: The United States of America as represented by the Secretary of the Navy, Newport, RI (US)

(72) Inventor: Makia S Powell, North Dighton, MA (US)

(73) Assignee: The United States of America as Represented by the Secretary of the Navy

( * ) Notice: Subject to any disclaimer, the term of this patent is extended or adjusted under 35 U.S.C. 154(b) by 1121 days.

(21) Appl. No.: 17/575,703

(22) Filed: Jan. 14, 2022

(51) Int. Cl.
*G06F 7/487* (2006.01)

(52) U.S. Cl.
CPC .................................. *G06F 7/4876* (2013.01)

(58) Field of Classification Search
CPC ...... G06F 7/4876; G06F 7/485; F06F 7/5443; H03K 19/21
See application file for complete search history.

(56) References Cited

U.S. PATENT DOCUMENTS

| | | | | |
|---|---|---|---|---|
| 4,928,259 A * | 5/1990 | Galbi | .................... | G06F 7/4876 |
| | | | | 708/499 |
| 5,276,634 A * | 1/1994 | Suzuki | .................... | G06F 7/483 |
| | | | | 708/503 |
| 2022/0350569 A1 * | 11/2022 | Zhang | .................... | G06N 3/063 |
| 2023/0195413 A1 * | 6/2023 | Kastrup | .................. | G05B 9/03 |
| | | | | 708/200 |
| 2023/0266941 A1 * | 8/2023 | Jiang | ........................ | G06F 7/485 |

OTHER PUBLICATIONS

R. K. Kodali, S. K. Gundabathula and L. Boppana, "FPGA implementation of IEEE-754 floating point Karatsuba multiplier," 2014 International Conference on Control, Instrumentation, Communication and Computational Technologies (ICCICCT), Kanyakumari, India, 2014, pp. 300-304 (Year: 2014).*
S. Arish and R. K. Sharma, "An efficient binary multiplier design for high speed applications using Karatsuba algorithm and Urdhva-Tiryagbhyam algorithm," 2015 Global Conference on Communication Technologies (GCCT), Thuckalay, India, 2015, pp. 192-196, doi: 10.1109/GCCT.2015.7342650 (Year: 2015).*
S.-R. Kuang, J.-P. Wang and H.-Y. Hong, "Variable-Latency Floating-Point Multipliers for Low-Power Applications," in IEEE Transactions on Very Large Scale Integration (VLSI) Systems, vol. 18, No. 10, pp. 1493-1497, Oct. 2010, doi: 10.1109/TVLSI.2009.2025167 (Year: 2010).*

* cited by examiner

Primary Examiner — Emily E Larocque
Assistant Examiner — Jerome Anthony Klosterman, II
(74) Attorney, Agent, or Firm — James M. Kasischke; Jeffry C. Severson

(57) ABSTRACT

A multiplier apparatus computes multiplication of a multiplicand and a multiplier to give a product. A multiplicand separator and a multiplier separator receive n bit numbers and separate them into high order segments and low order segments. A first multiplier multiplies the high order segments. Second and third multipliers multiply the high order and low order segments. The products of these multiplications are added together by an adder to give a multiplication product. Another implementation uses rounding logic to allow fewer bits in the multipliers. The adder can be a three-way adder or a combination of two-way adders.

4 Claims, 4 Drawing Sheets

CLOCKLESS PARALLEL MULTIPLICATION CIRCUIT

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to an implementation of a floating point multiplication for digital circuitry.

(2) Description of the Prior Art

In digital computer processing, signed floating point numbers can be utilized in a form having a mantissa multiplied by a base having an exponent. Mathematical functions are carried out on these numbers in semiconductor floating point units or processors in binary format. A floating point unit does addition, subtraction, multiplication, and division operations on floating point numbers. In many implementations the exponent is biased which means that a number called the bias is subtracted from the written exponent before computation. This allows implementations to use a positive representation of a negative exponent, since the written exponent minus the bias is negative. The examples assume a normalized format, which means that the first bit of the mantissa is '1'.

The Institute of Electrical and Electronics Engineers (IEEE) has standards for floating point representation of numbers. The current standard used by most commercial processors is IEEE-754-2008. The output of this format is a binary floating point number that contains a sign, biased exponent, and mantissa. A 16-bit IEEE-754 floating point number is given by the following format:

seee eemm mmmm mmmm where each letter represents a binary digit or bit; s is the sign bit; each e is an exponent bit; and each m is a mantissa bit. In this format the minimum exponent is −14, and the maximum exponent is 15. The exponent bias is 15. This means that 15 is subtracted from the exponent value to give the actual value. An exponent value having all "1"s is used to represent infinity or "not a number" known as NaN. An exponent value having all zeroes is used to represent a denormalized number. IEEE-754 32 bit, 64 bit, 128 bit, and 256 bit floating point formats are similar.

Important resources for floating point unit mathematical routine implementations are size and speed. The size of the implementation is the number of gates that are required. Typical commercial 32 bit multiply/accumulate floating point units without division take approximately 12, 800 gates. This typical commercial implementation runs at 1 MFlop/Mhz or 55 Mhz. When utilizing field programmable gate arrays (FPGAs) and other special purpose semiconductors, it is often desirable to reduce the number of gates and chip resources required for processing floating point numbers. It is further desirable to process these numbers as quickly as possible.

FIG. 1 provides a diagram illustrating the normal process for multiplying floating point numbers. As illustrated at 10, the floating point multiplicand A and multiplier B are first broken down into segments: the sign bit-s, exponent segment having exponent bits e, and mantissa segment having mantissa bits m. Standard logic, not shown, is utilized to identify exceptions such as not a number or NaN based on the exponent bits. The sign bits $A_{sgn}$ and $B_{sgn}$ are processed by performing an exclusive OR operation 12 on sign bits $A_{sgn}$ and $B_{sgn}$, resulting in a product sign bit, $P_{sgn}$. The multiplicand and multiplier exponent segments $A_{exp}$ and $B_{exp}$ are added together In multiplication exponent adder 14 and provided as the product exponent $P_{exp}$. Exponent overflow conditions are flagged as known in the art, but not illustrated in FIG. 1. The mantissa segments $A_{man}$ and $B_{man}$ are multiplied in a mantissa multiplier 16 to produce a product mantissa $P_m$. Mantissa multiplier 16 can utilize various logic architectures to efficiently produce the product of a multiplier and multiplicand. These algorithms include Baugh-Wooley algorithm, Wallace trees, or Dadda multipliers.

The number of bits in the product mantissa segment n is the sum of the number of bits in the multiplicand mantissa segment $n_A$ and the multiplier mantissa segment ng with all of these algorithms. For example, when a 10-bit multiplicand mantissa $A_{man}$ is being multiplied with a 10-bit multiplier mantissa $B_{man}$, this will result in a 20-bit product mantissa $P_{man}$. The least significant 10 bits of product mantissa $P_{man}$ are used for rounding in 18 and discarded. Rounding in 18 can be performed by a variety of techniques known in the art such as truncation and banker's rounding. Typically, this results in the least-significant n/2−1 bits of the product mantissa $P_{man}$ being discarded as insignificant, resulting in a rounded product mantissa $P_m$.

The rounded product mantissa is recombined with the product exponent in normalization module 20. Normalization module 20 receives the rounded product mantissa $P_m$ which is not normalized. Normalization module 20 locates the most significant bit in the rounded product mantissa $P_m$. The product exponent $P_{exp}$ is adjusted accordingly to provide an adjusted product exponent $P_{exp}'$ to account for the radix being positioned between the most significant bit and next most significant bit. In conformance with the IEEE 754 standard, the leading most significant bit is also dropped as part of this operation. Reference number 22 indicates assembly of the final floating point product P produced by reassembling the product sign bit $P_{sgn}$ with the adjusted product exponent $P_{exp}'$ and the product mantissa Pm.

When the number of bits that a multiplier processes doubles, its area increases quadratically, and its speed decreases by 50%. For example, a 64-bit multiplier is roughly 4 times as large, and twice as slow as a 32-bit multiplier, and 8 times as large and four times as slow as a 16-bit multiplier. One prior art option for reducing the resource requirements and increasing speed is to round or truncate the multiplicand and multiplier to the number of bits that give significant output. This allows the use of smaller, faster multipliers; however, it also introduces significant worst case error into the multiplier by introducing multiplicative rounding errors.

In view of this, it is desirable to have a multiplier for floating point numbers that is more efficient in digital circuit area and speed while providing sufficiently accurate results.

US 12,596,527 B1

3

SUMMARY OF THE INVENTION

The first object of the present invention is to provide an implementation of a multiplier utilizing fewer gates.

Another object is to provide an implementation of a multiplier capable of operating at faster speeds than existing units.

Accordingly, there is provided a multiplier apparatus that computes multiplication of a multiplicand and a multiplier to give a product. A multiplicand separator and a multiplier separator receive n bit numbers and separate them into high order segments and low order segments. A first multiplier multiplies the high order segments. Second and third multipliers multiply the high order and low order segments. The products of these multiplications are added together by an adder to give a multiplication product. Another implementation uses rounding logic to allow fewer bits in the multipliers. The adder can be a three-way adder or a combination of two-way adders. This apparatus can also be applied in a floating point embodiment.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
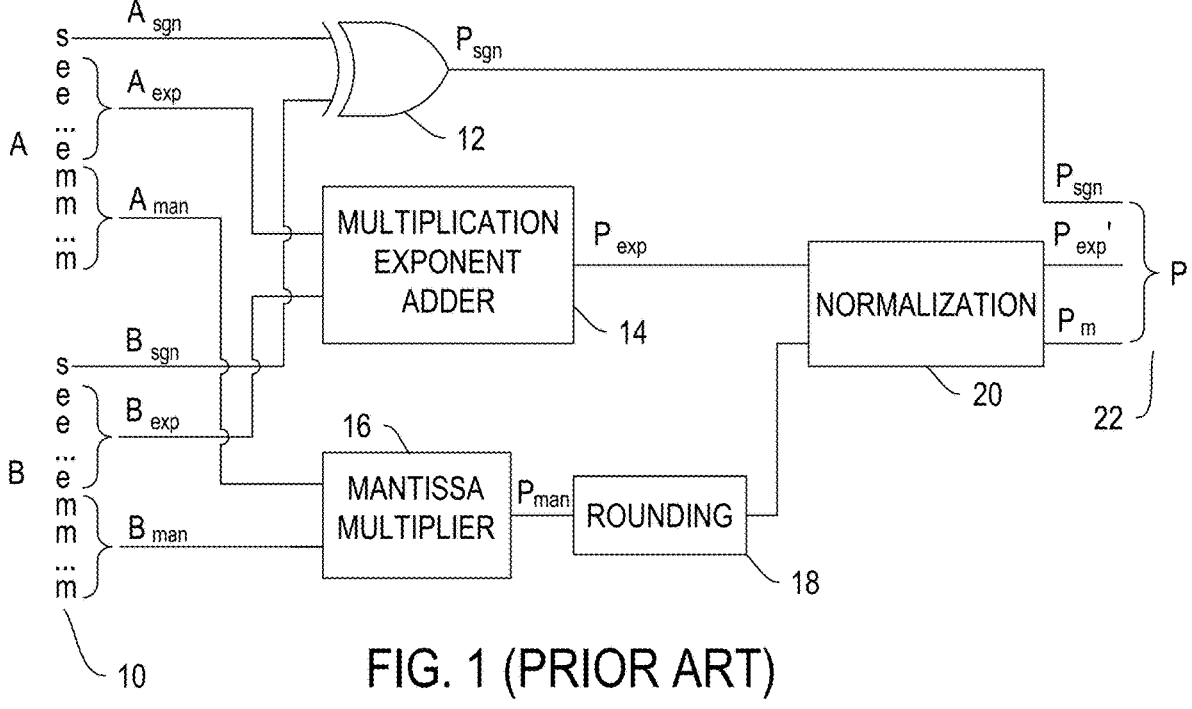
FIG. 1 is a diagram of a prior art floating point multiplication implementation.
Figure 2:
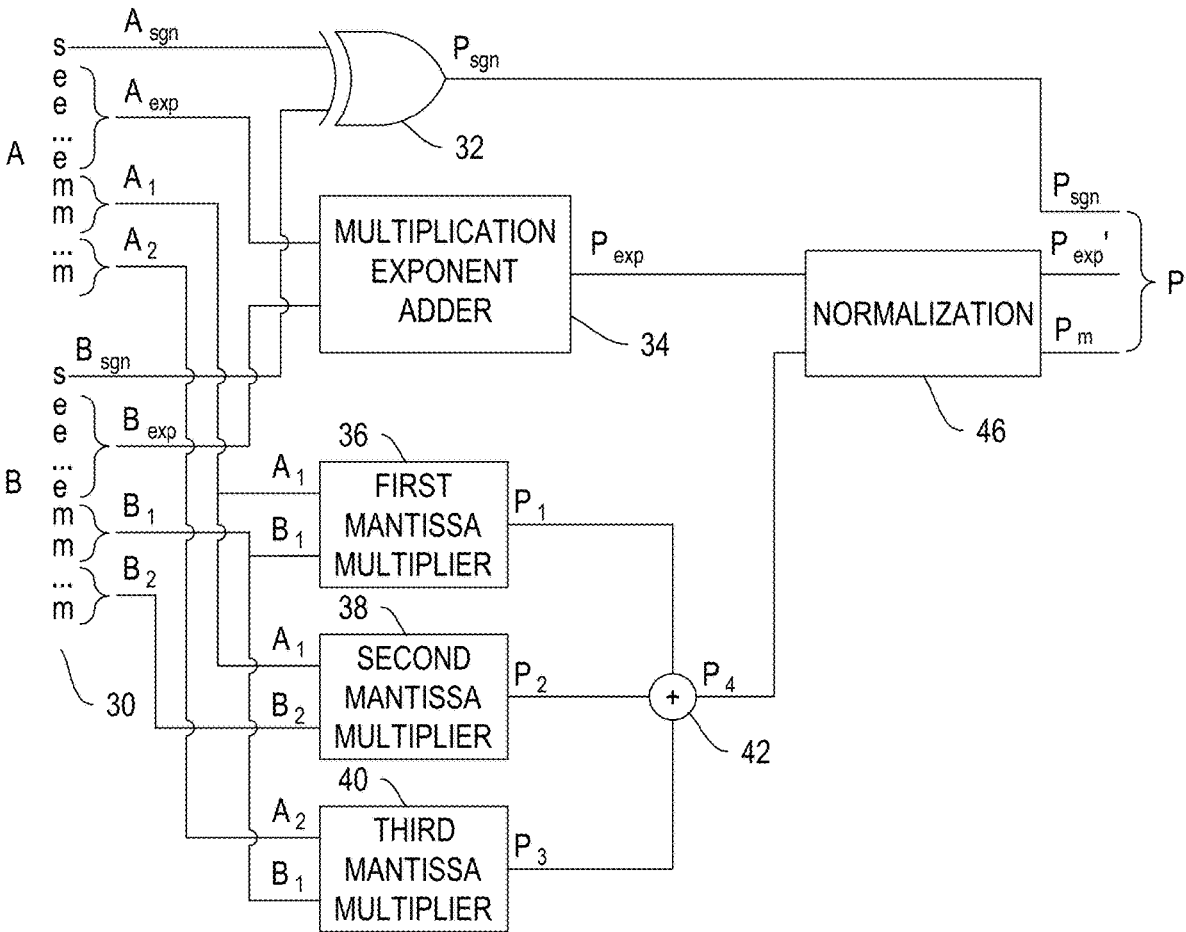
FIG. 2 is a detailed diagram of a floating point implementation according to one embodiment of the present invention.

FIG. 2 shows one embodiment of floating point multiplication utilizing the current invention. The implementation receives a multiplicand A and a multiplier B in floating point format. This can be in IEEE 754 floating point format or any similar format having a sign bit s, a plurality of exponent bits e, and a plurality of mantissa bits m. A half precision IEEE 754 floating point number utilizes 16 bits with 1 sign bit, 5 exponent bits, and 10 mantissa bits. A single precision IEEE 754 floating point number utilizes 32 bits with 1 sign bit, 8 exponent bits, and 23 mantissa bits. A double precision IEEE 754 number has 1 sign bit, 11 exponent bits, and 52 mantissa bits. Quad precision occupies 128 bits. Typically, the exponent bits are biased in order to show fractions with positive exponents.

Multiplicand A and multiplier B are received at 30 as parallel binary numbers in floating point format. Segments of the floating numbers are separated by connecting the bit values to the components utilizing the segments as input. Sign bits $A_{sgn}$ and $B_{sgn}$ are segregated for processing. Exponential bits are grouped as multiplicand exponential segment $A_{exp}$ and multiplier exponential segment $B_{exp}$. The most significant bit of the mantissa in floating point is "1", and this is assumed when processing the mantissa segments $A_{man}$ and $B_{man}$. (In the IEEE 754 standard this bit is "implicit" and not stored.) During separation of the number into segments, this implicit most significant bit must be restored to the higher order segments or otherwise accounted for. For discussion herein, the mantissas including the leading "1" will be used, and the mantissa segment will have an additional bit when compared to the IEEE format mantissa segment.

As indicated at 30, high order mantissa bits and low order mantissa bits are grouped separately as a high order multiplicand mantissa segment $A_1$, a low order multiplicand mantissa segment $A_2$, a high order multiplier mantissa segment $B_1$, and a low order multiplier mantissa segment $B_2$.

In this embodiment, the number of bits in the low order segment and the high order segment are chosen to avoid rounding problems. If n is the number of bits in the mantissa segment, these bits are located at positions n−1 through 0. The mantissa should be divided so that the high order segment should have bits in places n−1 through n/2−1. The low order segment should have bits in places n/2−2 through 0. If the mantissa has an odd number of bits n, the high order segment should have bits in positions n−1 through (n−1)/2−1, and the low order segment should have bits in places (n−1)/2−2 through 0. In either case both high order multiplicand mantissa segment $A_1$ and the high order multiplier mantissa segment $B_1$ should have the same number of bits. The low order multiplicand mantissa segment $A_2$ and the low order multiplier mantissa segment $B_2$ should also have the same number of bits.

The sign of the product is determined utilizing XOR gate 32. XOR gate 32 receives multiplicand sign bit $A_{sgn}$ and multiplier sign bit $B_{sgn}$. XOR gate 32 executes an exclusive OR function to give a product sign bit $P_{sgn}$.

In the prior art, multiplication exponent adder 34 is joined to receive multiplicand exponent segment $A_{exp}$ and multiplier exponent segment $B_{exp}$. These exponent segments are added to produce a provisional product exponent segment $P_{exp}$. $P_{exp}$ is provisional because it may need to be corrected when the floating point number is normalized after multiplication.

Multiplication of the mantissa is carried out utilizing three multipliers: a first mantissa multiplier 36, a second mantissa multiplier 38, and a third mantissa multiplier 40. First mantissa multiplier 36 is joined to receive the high order multiplicand mantissa segment $A_1$ and the high order multiplier mantissa segment $B_1$. Segments $A_1$ and $B_1$ are multiplied to provide a high order partial product mantissa segment $P_1$. In the first embodiment, high order partial product will have bits in places 2n−1 through n/2−1 of the final product because the number of bit places is the sum of the number of bit places in the multiplicand $A_1$ and the multiplier $B_1$ plus one bit for carries in the most significant place.

Second mantissa multiplier 38 is joined to receive the high order multiplicand mantissa segment $A_1$ and the low order multiplier mantissa segment $B_2$. These segments $A_1$ and $B_2$ are multiplied to give a first intermediate order partial product mantissa segment $P_2$. In this embodiment, first intermediate order partial product will have 3n/2−1 bits in places 3n/2−2 through 0. When n is odd, the first intermediate order partial product mantissa segment $P_2$ has 3(n−1)/2−1 bits. The bits will be in places 3(n−1)/2−2 through 0.

Third mantissa multiplier 40 is joined to receive the low order multiplicand mantissa segment $A_2$ and the high order multiplier mantissa segment $B_1$. Multiplier 40 multiplies these segments to give a second intermediate order partial product mantissa segment $P_3$ having bits in places 3n/2−2 through 0. As above, the bits will be in places 3(n−1)/2−2 through 0 when n is odd. The low order multiplicand mantissa segment $A_2$ is not multiplied by the low order multiplier mantissa segment $B_2$ because, the multiplication of $A_2*B_2$ results in a product that is too small to affect the top $2n-1$ through $2n$ bits of the summed product.

A three-way adder 42 is utilized to add the high order mantissa segment $P_1$, the first intermediate order mantissa segment $P_2$, and the second intermediate order mantissa segment $P_3$. The higher order mantissa segment $P_1$ and low order mantissa segments $P_2$ and $P_3$ are aligned so that the appropriate place values add properly. This can be done by zero padding the low or high order terms. Three way adder 42 produces the sum $P_4$. In an alternative embodiment, two adders can be used to combine the partial product mantissa segments.

Figure 4:
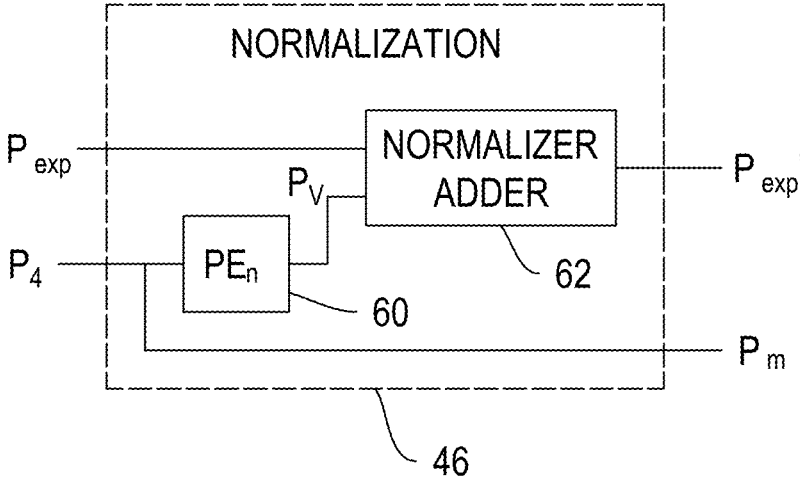
FIG. 4 is a detailed diagram of normalizer 46.

Normalization 46 receives the unscaled product $P_4$ and the provisional product exponent segment $P_{exp}$ to renormalize $P_4$. Additional detail concerning normalization is provided in FIG. 4. Renormalization is performed by finding the place value $P_v$ of the most significant asserted bit in $P_4$ utilizing a priority encoder 60. The provisional product exponent segment $P_{exp}$ is then incremented by this place value $P_v$ utilizing normalizer adder 62. Normalizer adder 62 has an exponent input receiving $P_{exp}$, a place increment input receiving $P_v$, and a normalized exponent output providing $P_{exp}'$. The leading one is dropped as being assumed. $P_4$ is provided as $P_m$, and $P_{exp}$ is provided as normalized exponent, $P_{exp}'$.

Rounding and truncation can occur before or after renormalization. An advantage of truncating early is that the truncated number is shorter for the priority encoder, but this runs the risk of zeroing out smaller values. In any case, rounding uses the most significant bit of the portion being truncated. If this bit is asserted, the least significant bit of the truncated number is incremented. As an example, if $P_4$ has bits n to 0, it may be desirable to truncate it to bits n through $(n+1)/2$. To round, if bit $n/2$ is 1, bit $(n+1)/2$ is incremented. Other rounding schemes can be used. To provide the floating point output, the sign bit, the exponent segment, and normalized product mantissa are reassembled into a binary floating point number. This may be performed by providing the appropriate outputs in the correct bit positions.

In the first embodiment, shown in FIG. 2, the first, second, and third multipliers are each roughly half the size of the prior art multiplier in bits. Each of these half bit number sized multipliers has an area that is 25% of the full sized multiplier. These half bit number multipliers are twice as fast. The final multiplier utilizing this first embodiment has 75% of the area of the prior art multiplier. The adders do not add significant delay to the path since an n-bit multiplier already contains n adders.

It is acknowledged that the final product will have some error when computed using this method. The worst case error occurs when multiplication of the high order multiplicand segment $A_1$ and the high order multiplier segment $B_1$ has no carry out, and the multiplication of the low order multiplicand segment $A_2$ and the low order multiplier segment $B_2$ has a carry out.

Figure 3:
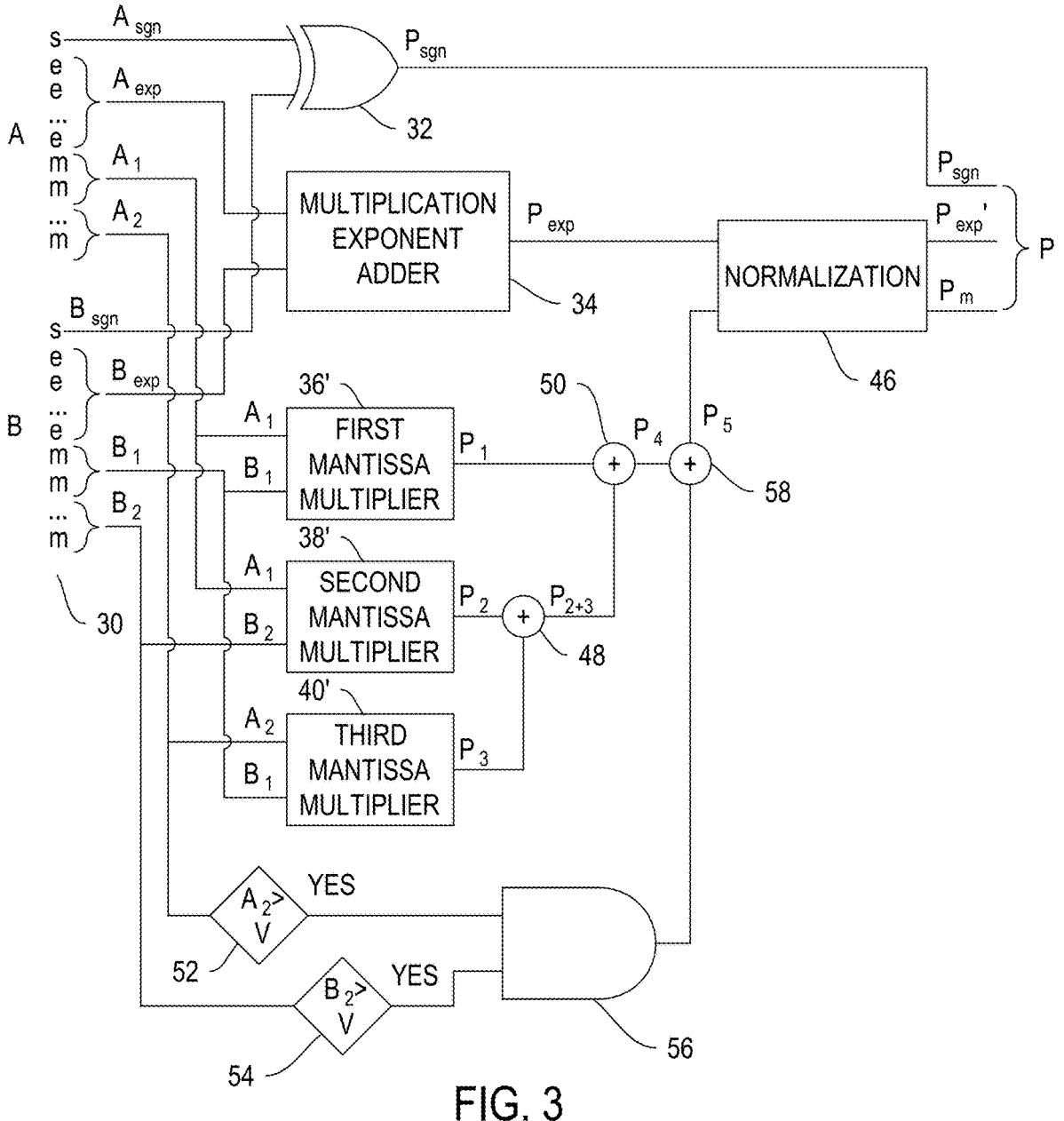
FIG. 3 is a detailed diagram a floating point implementation according to a second embodiment of the present invention.

FIG. 3 illustrates an alternative embodiment using one bit smaller multipliers. Signs are computed as described above. Separate rounding logic is required. This embodiment can be used to accommodate available circuit resources. The multiplier and multiplicand have mantissas with n bits in positions $n-1$ through 0. This includes restoration of the assumed leading "1". The mantissas are divided with the higher order segments, $A_1$ and $B_1$, having values in places $n-1$ through $n/2$ and the lower order segments, $A_2$ and $B_2$, having values in places $(n/2)-1$ through 0. If the mantissas have an odd number of bits, the higher order segments, $A_1$ and $B_1$, will values in places $n-1$ through $(n-1)/2$. The lower order segments, $A_2$ and $B_2$, have values in places $(n-1)/2-1$ through 0. As with the first embodiment, both high order multiplicand mantissa segment $A_1$ and the high order multiplier mantissa segment $B_1$ should have the same number of bits. The low order multiplicand mantissa segment $A_2$ and the low order multiplier mantissa segment $B_2$ should also have the same number of bits.

As above, multiplication of the mantissa is carried out utilizing three multipliers: a first mantissa multiplier 36', a second mantissa multiplier 38', and a third mantissa multiplier 40'. First mantissa multiplier 36' is joined to receive and multiply the high order multiplicand mantissa segment $A_1$ and the high order multiplier mantissa segment $B_1$. This multiplication provides a high order partial product mantissa segment $P_1$ having bits in places $2n-1$ through n of the final product.

Second mantissa multiplier 38' is joined to receive and multiply the high order multiplicand mantissa segment $A_1$ and the low order multiplier mantissa segment $B_2$. This multiplication gives a first intermediate order partial product mantissa segment $P_2$. In this embodiment, first intermediate order partial product will have bits in places $2n-(n/2)-1$ through 0. With an odd number of bits n for the segments, $A_1$ and $B_1$ will have bits in places $n-1$ through $(n-1)/2$, and $A_2$ and $B_2$ will have bits in places $(n-1)/2-1$ through 0.

Third mantissa multiplier 40' is joined to receive the low order multiplicand mantissa segment $A_2$ and the high order multiplier mantissa segment $B_1$. Multiplier 40' multiplies these segments to give a second intermediate order partial product mantissa segment $P_3$ having bits in places $2n-(n/2)-2$ through 0. As above, the low order multiplicand mantissa segment $A_2$ is not multiplied by the low order multiplier mantissa segment $B_2$.

In this embodiment, two two-way adders are used instead of one three-way adder. The first embodiment can also use two-way adders. $P_2$ is added to $P_3$ in first two-way adder 48 to produce an intermediate result $P_{2+3}$. The intermediate result $P_{2+3}$ is added to $P_1$ to produce provisional sum $P_4$ in second two-way adder 50.

Rounding logic is used to compute a sum correction as follows. If both $A_2$ and $B_2$ are greater than a maximum low order segment value, $((2n-n/2-2)^2$ as described herein) then the product of these numbers will require the provisional sum $P_4$ to be rounded up by 1. $(2n-n/2-2)^2$ is identified as V in FIG. 3. This is implemented by logically comparing $A_2$ with $(2n-n/2-2)^2$ at 52, and logically comparing $B_2$ with $(2n-n/2-2)^2$ at 54. The results of the logical comparison is provided to an AND function 56. The output of the AND function 56 is added to provisional sum $P_4$ at place value $2n-n/2-2$ to give sum $P_5$ using adder 58. Values of $P_4$ in places $2n-n/2-3$ through 0 are dropped.

This apparatus can be implemented utilizing many different technologies. These technologies include field programmable gate arrays, application specific integrated circuits, portions of integrated circuits, programmable read only memory, programmable logic arrays, hard-wired electrical circuits, or the like.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed, and obviously, many modification and variations are possible in light of the above teaching. Such modifications and variations that may be apparent to a person skilled in the art are intended to be included within the scope of this invention as defined by the accompanying claims.

What is claimed is:

1. An apparatus for computing multiplication of a binary multiplicand having n bits and a binary multiplier having n bits to give a product comprising:

a first multiplier device having a high order multiplicand segment input and a high order multiplier segment input for receiving high order multiplicand bits and the high order multiplier bits and having a first multiplier device output for providing a product of the high order multiplicand segment input multiplied by the high order multiplier segment input;

a second multiplier device having a high order multiplicand segment input and a low order multiplier segment input for receiving the high order multiplicand bits and the low order multiplier bits and having a second multiplier device output for providing a product of the high order multiplicand segment input multiplied by the low order multiplier segment input;

a third multiplier device having a low order multiplicand segment input and a high order multiplier segment input for receiving the low order multiplicand bits and the high order multiplier bits and having a third multiplier device output for providing a product of the low order multiplicand segment input multiplied by the high order multiplier segment input;

an adder having a first adder input joined to the first multiplier device output, a second adder input joined to the second multiplier device output, and a third adder input joined to the third multiplier device output, and an adder output, said adder adding the first multiplier device output, the second multiplier device output, and the third multiplier device output to provide a multiplied product at the adder output;

a first comparator having a first input joined to receive the low order multiplicand bits, a second input joined to receive a preset maximum low order segment value, and an output providing an asserted output when the first input exceeds the preset maximum low order segment value;

a second comparator having a first input joined to receive the low order multiplier bits, a second input joined to receive a preset maximum low order segment value, and an output providing an asserted output when said first input exceeds the preset maximum low order segment value;

a logical AND having a first input joined to said first comparator output, a second input joined to said second comparator output, and a sum correction output as a logical AND of the first input and the second input; and a round up adder having a first input joined to receive said adder output, a second input joined to said logical AND sum correction output, and a corrected product output, said round up adder adding said second output to the first input to produce a corrected product at the corrected product output.

2. The apparatus of claim 1, wherein said adder comprises:

a first two-way adder having a first input joined to receive the second multiplier output, a second input joined to receive the third multiplier output, and an intermediate result output, said first two-way adder adding the first input, and the second input to provide the intermediate result at the intermediate result output; and a second two-way adder having a first input joined to receive the first multiplier output, a second input joined to said first two-way adder intermediate result output to receive the intermediate result, and a multiplied product output, said second two-way adder adding the first input and the second input to provide the multiplied product at the multiplied product output.

3. The apparatus of claim 1, wherein:

the binary multiplicand has an even number n of bits;

the binary multiplier has an even number n of bits;

said first multiplier device high order multiplicand segment input has $n/2$ bits in bit positions $n-1$ through $n/2-1$;

said first multiplier device high order multiplier segment input has $n/2$ bits in bit positions $n-1$ through $n/2-1$;

said second multiplier device high order multiplicand segment input has $n/2$ bits in bit positions $n-1$ through $n/2-1$;

said second multiplier device low order multiplier segment input has $n/2$ bits in bit positions $n/2-2$ through 0;

said third multiplier device low order multiplicand segment input has $n/2$ bits in bit positions $n/2-2$ through 0; and said third multiplier device high order multiplier segment input has $n/2$ bits in bit positions $n-1$ through $n/2-1$.

4. The apparatus of claim 1, wherein:

the binary multiplicand has an odd number n of bits;

the binary multiplier has an odd number n of bits;

said first multiplier device high order multiplicand segment input has $(n-1)/2+1$ bits in bit positions $n-1$ through $(n-1)/2-1$;

said first multiplier device high order multiplier segment input has $(n-1)/2+1$ bits in bit positions $n-1$ through $(n-1)/2-1$;

said second multiplier device high order multiplicand segment input has $(n-1)/2+1$ bits in bit positions $n-1$ through $(n-1)/2-1$;

said second multiplier device low order multiplier segment input has $(n-1)/2$ bits in bit positions $(n-1)/2-2$ through 0;

said third multiplier device low order multiplicand segment input has $(n-1)/2$ bits in bit positions $(n-1)/2-2$ through 0; and said third multiplier device high order multiplier segment input has $(n-1)/2+1$ bits in bit positions $n-1$ through $(n-1)/2-1$.

* * * * *